United States Patent
Liu et al.

(10) Patent No.: US 9,494,092 B2
(45) Date of Patent: Nov. 15, 2016

(54) SYSTEM AND METHOD FOR PREDICTING PARAMETERS ASSOCIATED WITH AIRFLOW THROUGH AN ENGINE

(71) Applicant: GM Global Technology Operations LLC, Detroit, MI (US)

(72) Inventors: Zhiping Steven Liu, Canton, MI (US); Gregory P. Matthews, West Bloomfield, MI (US); Anthony B. Will, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 14/211,389

(22) Filed: Mar. 14, 2014

(65) Prior Publication Data

US 2015/0260112 A1  Sep. 17, 2015

(51) Int. Cl.
*F02D 41/00* (2006.01)
*F02D 41/18* (2006.01)
*F02D 41/02* (2006.01)

(52) U.S. Cl.
CPC ....... *F02D 41/0002* (2013.01); *F02D 41/0062* (2013.01); *F02D 41/18* (2013.01); *F02D 41/0087* (2013.01); *F02D 2041/001* (2013.01); *F02D 2041/0012* (2013.01); *F02D 2041/0017* (2013.01); *F02D 2200/0402* (2013.01); *F02D 2200/0408* (2013.01); *F02D 2250/14* (2013.01); *Y02T 10/42* (2013.01); *Y02T 10/47* (2013.01)

(58) Field of Classification Search
CPC .................... F02D 41/0002; F02D 2041/0012; F02D 2041/0017; F02D 2200/0408
USPC .................. 123/350, 399; 701/102, 103, 115
See application file for complete search history.

(56) References Cited

U.S. PATENT DOCUMENTS

| | | | |
|---|---|---|---|
| 3,596,640 A | 8/1971 | Bloomfield |
| 4,129,034 A | 12/1978 | Niles et al. |
| 4,172,434 A | 10/1979 | Coles |
| 4,377,997 A | 3/1983 | Staerzl |
| 4,434,767 A | 3/1984 | Kohama et al. |
| 4,489,695 A | 12/1984 | Kohama et al. |

(Continued)

FOREIGN PATENT DOCUMENTS

| | | |
|---|---|---|
| CN | 1573916 A | 2/2005 |
| CN | 1888407 A | 1/2007 |

(Continued)

OTHER PUBLICATIONS

U.S. Appl. No. 14/548,501, filed Nov. 20, 2014, Beikmann et al.

(Continued)

*Primary Examiner* — Mahmoud Gimie

(57) ABSTRACT

A system according to the principles of the present disclosure includes an engine air sensor, an engine air prediction module, and an engine actuator module. The engine air sensor measures an engine air parameter at a first rate. The engine air parameter includes at least one of a mass flow rate of air flowing into an intake manifold of an engine, a pressure within the intake manifold, and a mass of air within a cylinder of the engine. The engine air prediction module predicts the engine air parameter at a second rate that is greater than the first rate. The engine actuator module controls an actuator of the engine based on at least one of the measured engine air parameter and the predicted engine air parameter.

20 Claims, 6 Drawing Sheets

(56) References Cited

U.S. PATENT DOCUMENTS

| | | |
|---|---|---|
| 4,509,488 A | 4/1985 | Forster et al. |
| 4,535,744 A | 8/1985 | Matsumura |
| 4,770,148 A | 9/1988 | Hibino et al. |
| 4,887,216 A | 12/1989 | Ohnari et al. |
| 4,974,563 A | 12/1990 | Ikeda et al. |
| 4,987,888 A | 1/1991 | Funabashi et al. |
| 5,042,444 A | 8/1991 | Hayes et al. |
| 5,094,213 A | 3/1992 | Dudek et al. |
| 5,226,513 A | 7/1993 | Shibayama |
| 5,278,760 A | 1/1994 | Ribbens et al. |
| 5,357,932 A | 10/1994 | Clinton et al. |
| 5,374,224 A | 12/1994 | Huffmaster et al. |
| 5,377,631 A | 1/1995 | Schechter |
| 5,423,208 A | 6/1995 | Dudek et al. |
| 5,465,617 A | 11/1995 | Dudek et al. |
| 5,540,633 A | 7/1996 | Yamanaka et al. |
| 5,553,575 A | 9/1996 | Beck et al. |
| 5,584,266 A | 12/1996 | Motose et al. |
| 5,669,354 A | 9/1997 | Morris |
| 5,692,471 A | 12/1997 | Zhang |
| 5,720,257 A | 2/1998 | Motose et al. |
| 5,813,383 A | 9/1998 | Cummings |
| 5,884,605 A | 3/1999 | Nagaishi et al. |
| 5,909,720 A | 6/1999 | Yamaoka et al. |
| 5,931,140 A | 8/1999 | Maloney |
| 5,934,263 A | 8/1999 | Russ et al. |
| 5,941,927 A | 8/1999 | Pfitz |
| 5,975,052 A | 11/1999 | Moyer |
| 5,983,867 A | 11/1999 | Stuber et al. |
| 6,125,812 A | 10/2000 | Garabedian |
| 6,158,411 A | 12/2000 | Morikawa |
| 6,244,242 B1 | 6/2001 | Grizzle et al. |
| 6,247,449 B1 | 6/2001 | Persson |
| 6,272,427 B1 | 8/2001 | Wild et al. |
| 6,286,366 B1 | 9/2001 | Chen et al. |
| 6,295,500 B1 | 9/2001 | Cullen et al. |
| 6,332,446 B1 | 12/2001 | Matsumoto et al. |
| 6,334,425 B1 | 1/2002 | Nagatani et al. |
| 6,355,986 B1 | 3/2002 | Kato et al. |
| 6,360,724 B1 | 3/2002 | Suhre et al. |
| 6,363,316 B1 | 3/2002 | Soliman et al. |
| 6,371,075 B2 | 4/2002 | Koch |
| 6,385,521 B1 | 5/2002 | Ito |
| 6,408,625 B1 | 6/2002 | Woon et al. |
| 6,520,140 B2 | 2/2003 | Dreymuller et al. |
| 6,546,912 B2 | 4/2003 | Tuken |
| 6,619,258 B2 | 9/2003 | McKay et al. |
| 6,622,548 B1 | 9/2003 | Hernandez |
| 6,694,806 B2 | 2/2004 | Kumagai et al. |
| 6,754,577 B2 | 6/2004 | Gross et al. |
| 6,760,656 B2 | 7/2004 | Matthews et al. |
| 6,850,831 B2 | 2/2005 | Buckland et al. |
| 6,909,961 B2 | 6/2005 | Wild et al. |
| 6,978,204 B2 | 12/2005 | Surnilla et al. |
| 6,980,902 B2 | 12/2005 | Nakazawa |
| 6,981,492 B2 | 1/2006 | Barba et al. |
| 6,983,737 B2 | 1/2006 | Gross et al. |
| 7,003,390 B2 | 2/2006 | Kaga |
| 7,024,301 B1 | 4/2006 | Kar et al. |
| 7,028,661 B1 | 4/2006 | Bonne et al. |
| 7,032,545 B2 | 4/2006 | Lewis et al. |
| 7,032,581 B2 | 4/2006 | Gibson et al. |
| 7,044,101 B1 | 5/2006 | Duty et al. |
| 7,063,062 B2 | 6/2006 | Lewis et al. |
| 7,066,121 B2 | 6/2006 | Michelini et al. |
| 7,066,136 B2 | 6/2006 | Ogiso |
| 7,069,718 B2 | 7/2006 | Surnilla et al. |
| 7,069,773 B2 | 7/2006 | Stempnik et al. |
| 7,086,386 B2 | 8/2006 | Doering |
| 7,100,720 B2 | 9/2006 | Ishikawa |
| 7,111,612 B2 | 9/2006 | Michelini et al. |
| 7,140,355 B2 | 11/2006 | Michelini et al. |
| 7,159,568 B1 | 1/2007 | Lewis et al. |
| 7,174,713 B2 | 2/2007 | Nitzke et al. |
| 7,174,879 B1 | 2/2007 | Chol et al. |
| 7,200,486 B2 | 4/2007 | Tanaka et al. |
| 7,203,588 B2 | 4/2007 | Kaneko et al. |
| 7,231,907 B2 | 6/2007 | Bolander et al. |
| 7,278,391 B1 | 10/2007 | Wong et al. |
| 7,292,231 B2 | 11/2007 | Kodama et al. |
| 7,292,931 B2 | 11/2007 | Davis et al. |
| 7,319,929 B1 | 1/2008 | Davis et al. |
| 7,363,111 B2 | 4/2008 | Vian et al. |
| 7,367,318 B2 | 5/2008 | Moriya et al. |
| 7,415,345 B2 | 8/2008 | Wild |
| 7,440,838 B2 | 10/2008 | Livshiz et al. |
| 7,464,676 B2 | 12/2008 | Wiggins et al. |
| 7,472,014 B1 | 12/2008 | Albertson et al. |
| 7,497,074 B2 | 3/2009 | Surnilla et al. |
| 7,499,791 B2 | 3/2009 | You et al. |
| 7,503,312 B2 | 3/2009 | Surnilla et al. |
| 7,509,201 B2 | 3/2009 | Bolander et al. |
| 7,555,896 B2 | 7/2009 | Lewis et al. |
| 7,577,511 B1 | 8/2009 | Tripathi et al. |
| 7,581,531 B2 | 9/2009 | Schulz |
| 7,614,384 B2 | 11/2009 | Livshiz et al. |
| 7,620,188 B2 | 11/2009 | Inoue et al. |
| 7,621,262 B2 | 11/2009 | Zubeck |
| 7,634,349 B2 | 12/2009 | Senft et al. |
| 7,685,976 B2 | 3/2010 | Marriott |
| 7,785,230 B2 | 8/2010 | Gibson et al. |
| 7,836,866 B2 | 11/2010 | Luken et al. |
| 7,849,835 B2 | 12/2010 | Tripathi et al. |
| 7,886,715 B2 | 2/2011 | Tripathi et al. |
| 7,930,087 B2 | 4/2011 | Gibson et al. |
| 7,946,263 B2 | 5/2011 | O'Neill et al. |
| 7,954,474 B2 | 6/2011 | Tripathi et al. |
| 8,050,841 B2 | 11/2011 | Costin et al. |
| 8,099,224 B2 | 1/2012 | Tripathi et al. |
| 8,108,132 B2 | 1/2012 | Reinke |
| 8,131,445 B2 | 3/2012 | Tripathi et al. |
| 8,131,447 B2 | 3/2012 | Tripathi et al. |
| 8,135,410 B2 | 3/2012 | Forte |
| 8,145,410 B2 | 3/2012 | Berger et al. |
| 8,146,565 B2 | 4/2012 | Leone et al. |
| 8,272,367 B2 | 9/2012 | Shikama et al. |
| 8,347,856 B2 | 1/2013 | Leone et al. |
| 8,473,179 B2 | 6/2013 | Whitney et al. |
| 8,616,181 B2 | 12/2013 | Sahandiesfanjani et al. |
| 8,646,430 B2 | 2/2014 | Kinoshita |
| 8,646,435 B2 | 2/2014 | Dibble et al. |
| 8,701,628 B2 | 4/2014 | Tripathi et al. |
| 8,706,383 B2 | 4/2014 | Sauve et al. |
| 8,833,058 B2 | 9/2014 | Ervin et al. |
| 8,833,345 B2 | 9/2014 | Pochner et al. |
| 8,869,773 B2 | 10/2014 | Tripathi et al. |
| 8,979,708 B2 | 3/2015 | Burtch |
| 9,140,622 B2 | 9/2015 | Beikmann |
| 9,222,427 B2 | 12/2015 | Matthews et al. |
| 2001/0007964 A1 | 7/2001 | Poljansek et al. |
| 2002/0039950 A1 | 4/2002 | Graf et al. |
| 2002/0156568 A1 | 10/2002 | Knott et al. |
| 2002/0162540 A1 | 11/2002 | Matthews et al. |
| 2002/0189574 A1 | 12/2002 | Kim |
| 2003/0116130 A1 | 6/2003 | Kisaka et al. |
| 2003/0123467 A1 | 7/2003 | Du et al. |
| 2003/0131820 A1 | 7/2003 | Mckay et al. |
| 2003/0172900 A1 | 9/2003 | Boyer et al. |
| 2004/0007211 A1 | 1/2004 | Kobayashi |
| 2004/0034460 A1 | 2/2004 | Folkerts et al. |
| 2004/0069290 A1 | 4/2004 | Bucktron et al. |
| 2004/0122584 A1 | 6/2004 | Muto et al. |
| 2004/0129249 A1 | 7/2004 | Kondo |
| 2004/0206072 A1 | 10/2004 | Surnilla et al. |
| 2004/0258251 A1 | 12/2004 | Inoue et al. |
| 2005/0016492 A1 | 1/2005 | Matthews |
| 2005/0056250 A1 | 3/2005 | Stroh |
| 2005/0098156 A1 | 5/2005 | Ohtani |
| 2005/0131618 A1 | 6/2005 | Megli et al. |
| 2005/0197761 A1 | 9/2005 | Bidner et al. |
| 2005/0199220 A1 | 9/2005 | Ogiso |
| 2005/0204726 A1 | 9/2005 | Lewis |
| 2005/0204727 A1 | 9/2005 | Lewis et al. |
| 2005/0205028 A1 | 9/2005 | Lewis et al. |

(56) References Cited

U.S. PATENT DOCUMENTS

| | | |
|---|---|---|
| 2005/0205045 A1 | 9/2005 | Michelini et al. |
| 2005/0205060 A1 | 9/2005 | Michelini et al. |
| 2005/0205063 A1 | 9/2005 | Kolmanovsky et al. |
| 2005/0205069 A1 | 9/2005 | Lewis et al. |
| 2005/0205074 A1 | 9/2005 | Gibson et al. |
| 2005/0235743 A1 | 10/2005 | Stempnik et al. |
| 2006/0107919 A1 | 5/2006 | Nishi et al. |
| 2006/0112918 A1 | 6/2006 | Persson |
| 2006/0130814 A1 | 6/2006 | Bolander et al. |
| 2006/0178802 A1 | 8/2006 | Bolander et al. |
| 2007/0012040 A1 | 1/2007 | Nitzke et al. |
| 2007/0042861 A1 | 2/2007 | Takaoka et al. |
| 2007/0051351 A1 | 3/2007 | Pallett et al. |
| 2007/0100534 A1 | 5/2007 | Katsumata |
| 2007/0101969 A1 | 5/2007 | Lay et al. |
| 2007/0107692 A1 | 5/2007 | Kuo et al. |
| 2007/0131169 A1 | 6/2007 | Ahn |
| 2007/0131196 A1 | 6/2007 | Gibson et al. |
| 2007/0135988 A1 | 6/2007 | Kidston et al. |
| 2007/0235005 A1 | 10/2007 | Lewis |
| 2008/0000149 A1 | 1/2008 | Aradi |
| 2008/0041327 A1 | 2/2008 | Lewis et al. |
| 2008/0066699 A1 | 3/2008 | Michelini et al. |
| 2008/0098969 A1 | 5/2008 | Reed et al. |
| 2008/0109151 A1 | 5/2008 | Jaros et al. |
| 2008/0121211 A1 | 5/2008 | Livshiz et al. |
| 2008/0154468 A1 | 6/2008 | Berger et al. |
| 2008/0254926 A1 | 10/2008 | Schuseil et al. |
| 2008/0262698 A1 | 10/2008 | Lahti et al. |
| 2008/0288146 A1 | 11/2008 | Beechie et al. |
| 2009/0007877 A1 | 1/2009 | Raiford |
| 2009/0013667 A1 | 1/2009 | Winstead |
| 2009/0013668 A1 | 1/2009 | Winstead |
| 2009/0013669 A1 | 1/2009 | Winstead |
| 2009/0013969 A1 | 1/2009 | Winstead |
| 2009/0018746 A1 | 1/2009 | Miller et al. |
| 2009/0030594 A1 | 1/2009 | You et al. |
| 2009/0042458 A1 | 2/2009 | Kinoshita |
| 2009/0042463 A1 | 2/2009 | Kinoshita |
| 2009/0118914 A1 | 5/2009 | Schwenke et al. |
| 2009/0118968 A1* | 5/2009 | Livshiz ............... F02D 11/105 701/102 |
| 2009/0118975 A1 | 5/2009 | Murakami et al. |
| 2009/0118986 A1 | 5/2009 | Kita |
| 2009/0177371 A1 | 7/2009 | Reinke |
| 2009/0204312 A1 | 8/2009 | Moriya |
| 2009/0241872 A1 | 10/2009 | Wang et al. |
| 2009/0248277 A1 | 10/2009 | Shinagawa et al. |
| 2009/0248278 A1 | 10/2009 | Nakasaka |
| 2009/0292435 A1 | 11/2009 | Costin et al. |
| 2010/0006065 A1 | 1/2010 | Tripathi et al. |
| 2010/0010724 A1 | 1/2010 | Tripathi et al. |
| 2010/0012072 A1 | 1/2010 | Leone et al. |
| 2010/0030447 A1 | 2/2010 | Smyth et al. |
| 2010/0036571 A1 | 2/2010 | Han et al. |
| 2010/0042308 A1 | 2/2010 | Kobayashi et al. |
| 2010/0050993 A1 | 3/2010 | Zhao et al. |
| 2010/0059004 A1 | 3/2010 | Gill |
| 2010/0100299 A1 | 4/2010 | Tripathi et al. |
| 2010/0107630 A1 | 5/2010 | Hamama et al. |
| 2010/0211299 A1 | 8/2010 | Lewis et al. |
| 2010/0222989 A1 | 9/2010 | Nishimura |
| 2010/0282202 A1 | 11/2010 | Luken |
| 2010/0318275 A1 | 12/2010 | Borchsenius et al. |
| 2011/0005496 A1 | 1/2011 | Hiraya et al. |
| 2011/0030657 A1 | 2/2011 | Tripathi et al. |
| 2011/0048372 A1 | 3/2011 | Dibble et al. |
| 2011/0088661 A1 | 4/2011 | Sczomak et al. |
| 2011/0094475 A1 | 4/2011 | Riegel et al. |
| 2011/0107986 A1 | 5/2011 | Winstead |
| 2011/0144883 A1 | 6/2011 | Rollinger et al. |
| 2011/0178693 A1* | 7/2011 | Chang ............... F02D 41/0087 701/103 |
| 2011/0208405 A1 | 8/2011 | Tripathi et al. |
| 2011/0213540 A1 | 9/2011 | Tripathi et al. |
| 2011/0213541 A1 | 9/2011 | Tripathi et al. |
| 2011/0251773 A1 | 10/2011 | Sahandiesfanjani et al. |
| 2011/0264342 A1 | 10/2011 | Baur et al. |
| 2011/0265454 A1 | 11/2011 | Smith et al. |
| 2011/0265771 A1 | 11/2011 | Banker et al. |
| 2011/0295483 A1 | 12/2011 | Ma et al. |
| 2011/0313643 A1 | 12/2011 | Lucatello et al. |
| 2012/0029787 A1 | 2/2012 | Whitney et al. |
| 2012/0055444 A1 | 3/2012 | Tobergte et al. |
| 2012/0103312 A1 | 5/2012 | Sasai et al. |
| 2012/0109495 A1 | 5/2012 | Tripathi et al. |
| 2012/0116647 A1 | 5/2012 | Pochner et al. |
| 2012/0143471 A1 | 6/2012 | Tripathi et al. |
| 2012/0180759 A1 | 7/2012 | Whitney et al. |
| 2012/0221217 A1 | 8/2012 | Sujan et al. |
| 2012/0285161 A1 | 11/2012 | Kerns et al. |
| 2013/0092127 A1 | 4/2013 | Pirjaberi et al. |
| 2013/0092128 A1 | 4/2013 | Pirjaberi et al. |
| 2013/0184949 A1 | 7/2013 | Saito et al. |
| 2013/0289853 A1 | 10/2013 | Serrano |
| 2014/0041625 A1 | 2/2014 | Pirjaberi et al. |
| 2014/0041641 A1 | 2/2014 | Carlson et al. |
| 2014/0053802 A1 | 2/2014 | Rayl |
| 2014/0053803 A1 | 2/2014 | Rayl |
| 2014/0053804 A1 | 2/2014 | Rayl et al. |
| 2014/0053805 A1 | 2/2014 | Brennan et al. |
| 2014/0069178 A1 | 3/2014 | Beikmann |
| 2014/0069374 A1 | 3/2014 | Matthews |
| 2014/0069375 A1 | 3/2014 | Matthews et al. |
| 2014/0069376 A1 | 3/2014 | Matthews et al. |
| 2014/0069377 A1 | 3/2014 | Brennan et al. |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1 | 4/2014 | Beikmann |
| 2014/0090624 A1 | 4/2014 | Verner |
| 2014/0102411 A1 | 4/2014 | Brennan |
| 2014/0190448 A1 | 7/2014 | Brennan et al. |
| 2014/0190449 A1 | 7/2014 | Phillips |
| 2014/0194247 A1 | 7/2014 | Burtch |
| 2014/0207359 A1 | 7/2014 | Phillips |
| 2015/0240671 A1 | 8/2015 | Nakamura |
| 2015/0260117 A1 | 9/2015 | Shost et al. |
| 2015/0354470 A1 | 12/2015 | Li et al. |
| 2015/0361907 A1 | 12/2015 | Hayman et al. |

FOREIGN PATENT DOCUMENTS

| | | |
|---|---|---|
| CN | 101220780 A | 7/2008 |
| CN | 101353992 A | 1/2009 |
| CN | 101476507 A | 7/2009 |
| CN | 101586504 A | 11/2009 |
| CN | 102454493 A | 5/2012 |
| EP | 1489595 A2 | 12/2004 |
| JP | 2010223019 A | 10/2010 |
| JP | 2011149352 | 8/2011 |

OTHER PUBLICATIONS

U.S. Appl. No. 61/952,737, filed Mar. 13, 2014, Shost et al.
U.S. Appl. No. 13/798,351, filed Mar. 13, 2013, Rayl.
U.S. Appl. No. 13/798,384, filed Mar. 13, 2013, Burtch.
U.S. Appl. No. 13/798,400, filed Mar. 13, 2013, Phillips.
U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,518, filed Mar. 13, 2013, Beikmann.
U.S. Appl. No. 13/798,536, filed Mar. 13, 2013, Matthews et al.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,624, filed Mar. 13, 2013, Brennan et al.
U.S. Appl. No. 13/798,701, filed Mar. 13, 2013, Burleigh et al.
U.S. Appl. No. 13/798,737, filed Mar. 13, 2013, Beikmann.
U.S. Appl. No. 13/798,775, filed Mar. 13, 2013, Phillips.

(56) References Cited

OTHER PUBLICATIONS

U.S. Appl. No. 13/799,116, filed Mar. 13, 2013, Brennan.
U.S. Appl. No. 13/799,129, filed Mar. 13, 2013, Beikmann.
U.S. Appl. No. 13/799,181, filed Mar. 13, 2013, Beikmann.
U.S. Appl. No. 14/310,063, filed Jun. 20, 2014, Wagh et al.
U.S. Appl. No. 14/300,469, filed Jun. 10, 2014, Li et al.
U.S. Appl. No. 14/449,726, filed Aug. 1, 2014, Hayman et al.
U.S. Appl. No. 14/734,619, filed Jun. 9, 2015, Matthews.
International Search Report and Written Opinion dated Jun. 17, 2015 corresponding to International Application No. PCT/US2015/019496, 14 pages.

\* cited by examiner

SYSTEM AND METHOD FOR PREDICTING PARAMETERS ASSOCIATED WITH AIRFLOW THROUGH AN ENGINE

CROSS-REFERENCE TO RELATED APPLICATIONS

This application is related to U.S. patent application Ser. No. 13/798,471 filed on Mar. 13, 2013, and Ser. No. 13/798,536 filed on Mar. 13, 2013. The entire disclosures of the above applications are incorporated herein by reference.

FIELD

The present disclosure relates to internal combustion engines, and more specifically, to systems and methods for predicting parameters associated with airflow through an engine.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes an engine air sensor, an engine air prediction module, and an engine actuator module. The engine air sensor measures an engine air parameter at a first rate. The engine air parameter includes at least one of a mass flow rate of air flowing into an intake manifold of an engine, a pressure within the intake manifold, and a mass of air within a cylinder of the engine. The engine air prediction module predicts the engine air parameter at a second rate that is greater than the first rate. The engine actuator module controls an actuator of the engine based on at least one of the measured engine air parameter and the predicted engine air parameter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some systems and methods control an actuator of an engine, such as a throttle valve, based on engine air parameters such as pressure within an intake manifold, a mass flow rate of air flow into the intake manifold, and a mass of air within a cylinder. In one example, the systems and methods determine desired values of the engine air parameters based on a desired torque output, and the systems and methods adjust the engine actuator to reduce the difference between the measured and desired values. Typically, the systems and methods measure the engine air parameters at predetermined intervals such as every 90 degrees of crankshaft rotation. The rate at which the engine air parameters are measured may be referred to as a sampling rate.

In certain engine operating conditions, such as when one or more cylinders of the engine are deactivated, the sampling rate may be insufficient to control the engine actuator as accurately as desired. Thus, the sampling rate may be increased. However, increasing the sampling rate may increase the number of computations and the amount of processing power required to measure the engine air parameters.

A system and method may estimate the engine air parameters at times between measurement times using a regression model, a mean value model, or a purely physical model. Estimating the engine air parameters using the regression model may require significant calibration work and complicated mathematical functions including regression terms and non-linear functions. Estimating the engine air parameters using the mean value model may not provide enough information regarding engine airflow behavior to control the engine actuator as accurately as desired. Estimating the engine air parameters using a pure physical model may require a complicated model and significant computation effort.

A system and method according to the present disclosure predicts the engine air parameters at a rate that is greater than the sampling rate to enable more accurate engine actuator control. The system and method may predict the engine air parameters every 6 to 10 degrees of crankshaft rotation. Predicting the engine air parameters may be referred to as virtual sampling and the rate at which the engine air parameters are predicted may be referred to as a virtual sampling rate. The system and method predicts the engine air parameters using a physical model with some simplification enabled by virtual sampling to reduce the amount of computation effort required.

Figure 1:
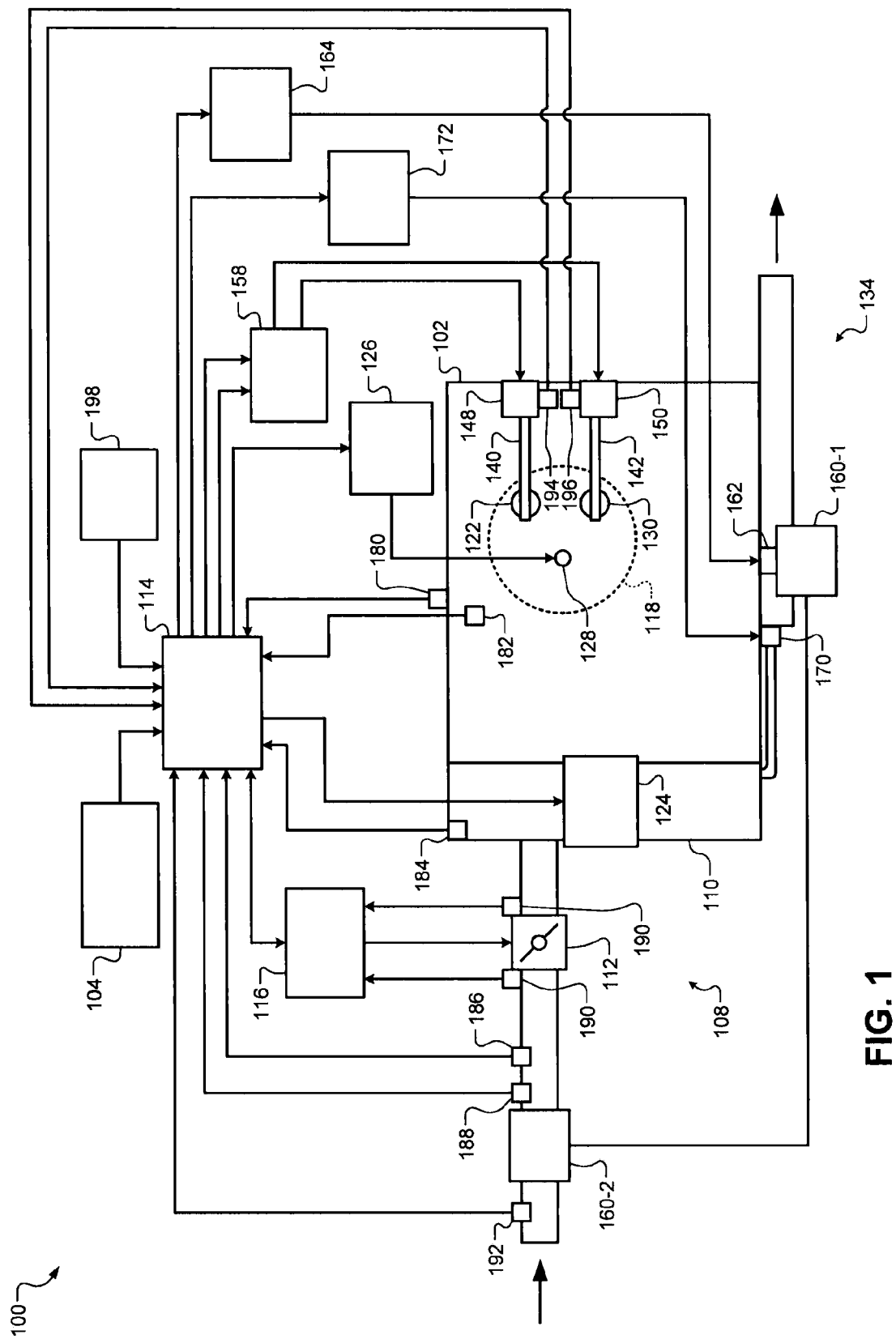
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston 125 (FIG. 3) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The ECM 114 may deactivate the cylinder 118 by instructing the valve actuator module 158 to disable opening of the intake valve 122 and/or the exhaust valve 130. The valve actuator module 158 may disable opening of the intake valve 122 by decoupling the intake valve 122 from the intake camshaft 140. Similarly, the valve actuator module 158 may disable opening of the exhaust valve 130 by decoupling the exhaust valve 130 from the exhaust camshaft 142. In various implementations, the valve actuator module 158 may control the intake valve 122 and/or the exhaust valve 130 using devices other than camshafts, such as electromagnetic or electrohydraulic actuators.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. The MAF sensor 186 may be located in a housing that also includes the throttle valve 112. The pressure of air at an inlet of the throttle valve 112 may be measured using a throttle inlet air pressure (TIAP) sensor 188. The TIAP sensor 188 may be located upstream from the throttle valve 112 and downstream from the compressor 160-2. The manifold pressure and the mass flow rate of intake air may be referred to as engine air parameters, and the MAP sensor 184, the MAF sensor 186, and the TIAP sensor 188 may be referred to as engine air sensors.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The position of the intake cam phaser 148 may be measured using an intake cam phaser position (ICPP) sensor 194. The position of the exhaust cam phaser 150 may be measured using an intake cam phaser position (ICPP) sensor 196.

The engine system 100 may include one or more other sensors 198 to measure operating conditions of the vehicle. The other sensor 198 may include an ambient air temperature sensor, an ambient air pressure sensor, and/or a vehicle speed sensor. The ECM 114 uses signals from the sensors to make control decisions for the engine system 100.

Figure 2:
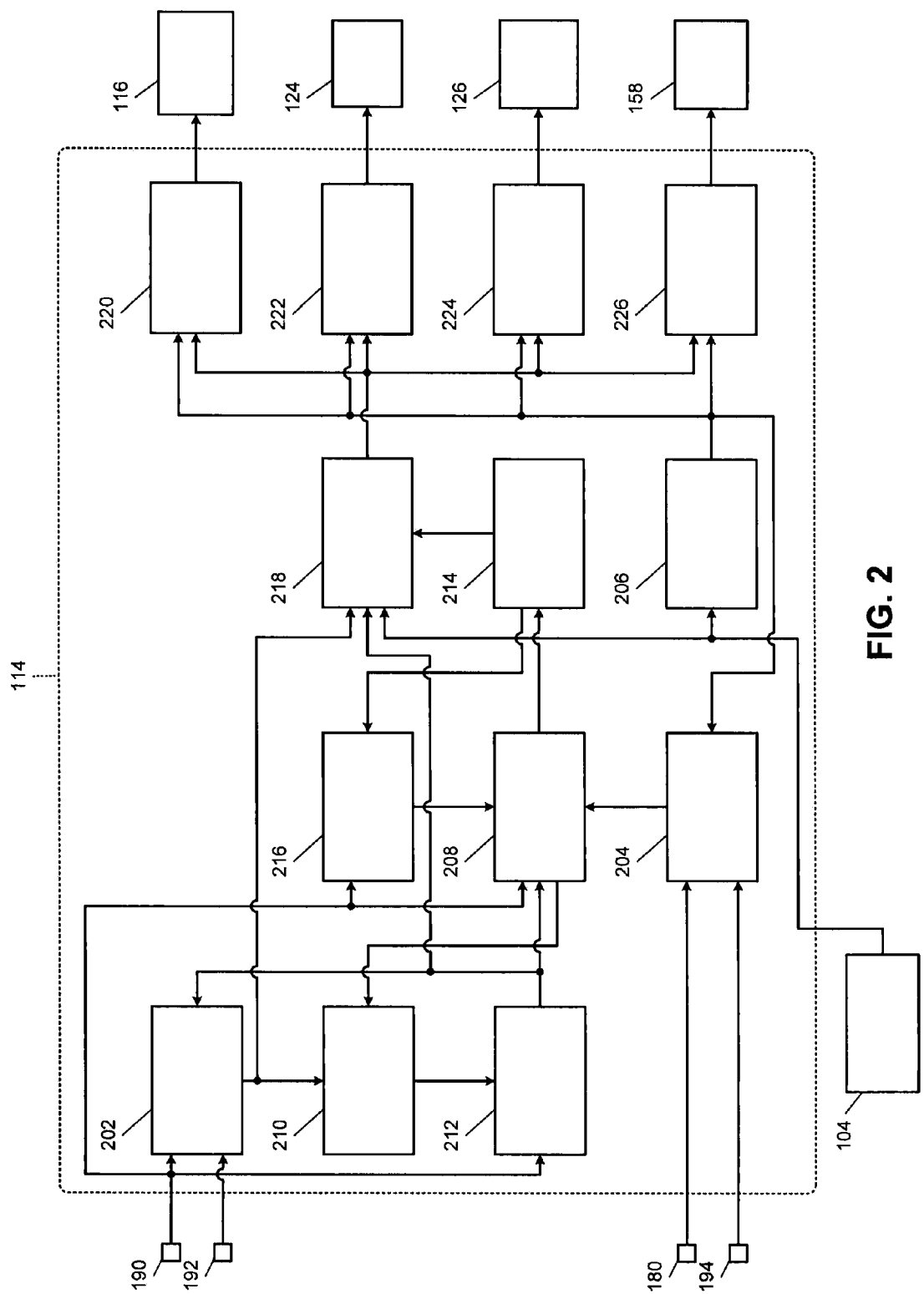
FIG. 2 is a functional block diagram of an example control system according to the principles of the present disclosure.

Referring now to FIG. 2, an example implementation of the ECM 114 includes an intake manifold airflow module 202. The intake manifold airflow module 202 predicts a mass flow rate of air flowing into the intake manifold 110. The MAF sensor 186 may measure the mass flow rate of intake air M times within a period, and the intake manifold airflow module 202 may predict the mass flow rate of intake air N times within the same period, where M and N are integers and N is greater than M. In other words, the MAF sensor 186 may measure the mass flow rate of intake air at a first rate, and the intake manifold airflow module 202 may predict the mass flow rate of intake air at a second rate that is greater than the first rate.

Figure 3:
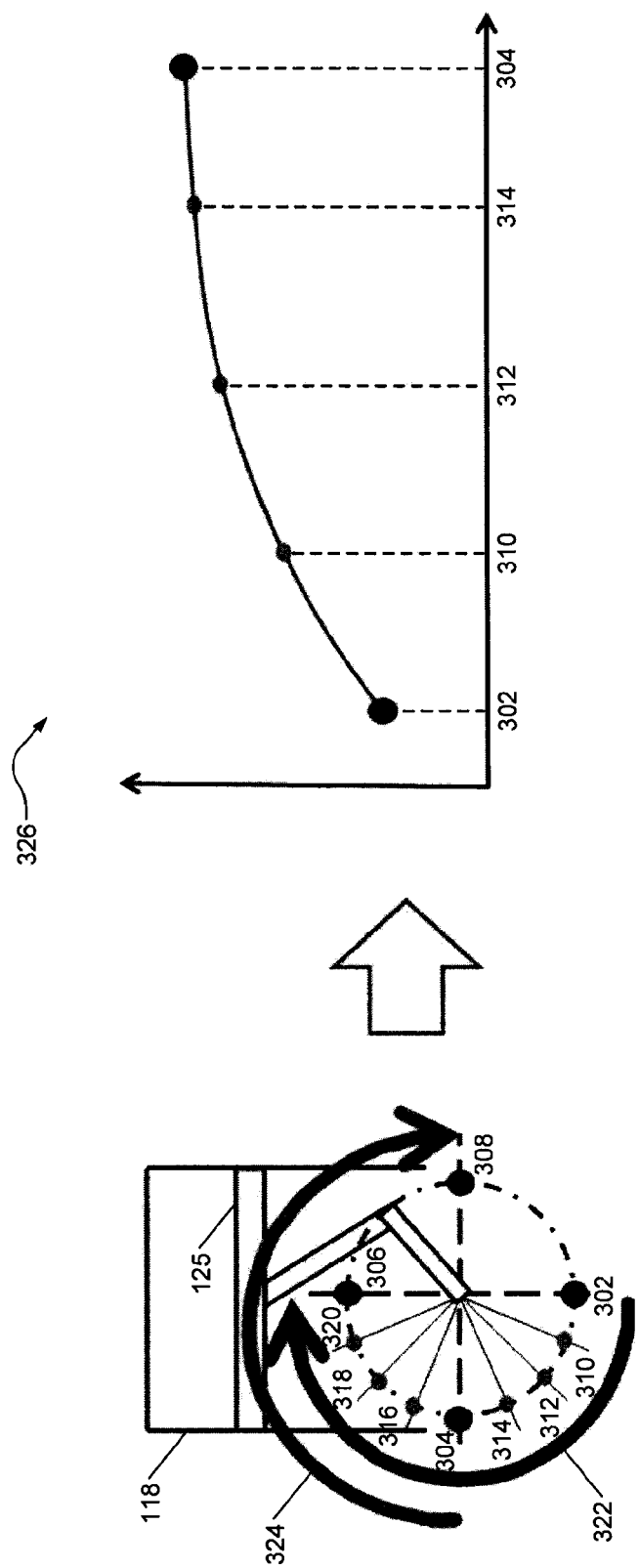
FIG. 3 is a side view of a piston in a cylinder and a graph illustrating an example system and method for predicting engine air parameters according to the principles of the present disclosure.

With additional reference to FIG. 3, the MAF sensor 186 may measure the mass flow rate of intake air at times 302, 304, 306, and 308, and the intake manifold airflow module 202 may predict the mass flow rate of intake air at times 310, 312, 314, 316, 318, and 320. The intake manifold airflow module 202 may predict the mass flow rate of intake air at times 310, 312, 314 after the time 302 and before the time 310. The periods between the times 302, 304, 306, and 308 may correspond to 90 degrees of crankshaft rotation, and the periods between the times 310, 312, 314, may correspond to 22.5 degrees of crankshaft rotation. In this regard, the mass flow rate of intake air may be measured or predicted every 22.5 degrees of crankshaft rotation.

The intake manifold airflow module 202 may predict the mass flow rate of intake air during an intake stroke of a cylinder of the engine 102. For example, the intake manifold airflow module 202 may predict the mass flow rate of intake air during first and second periods 322 and 324 that correspond to intake strokes of first and second cylinders of the engine 102, respectively. Further, the intake manifold airflow module 202 may predict the mass flow rate of intake air during a period from the time 306 to the time 302, which may correspond to an intake stroke of the cylinder 118.

The intake manifold airflow module 202 may predict the mass flow rate of intake air based on a pressure within the intake manifold 110, the position of the throttle valve 112 from the TPS sensor 190, an ambient air pressure, and/or a temperature of air in the cylinder. In one example, the intake manifold airflow module 202 may predict the mass flow rate of intake air based on a predetermined relationship between intake manifold pressure, ambient air pressure, cylinder air temperature, throttle position, and intake airflow. The predetermined relationship may be embodied in a lookup table and/or and equation and may be developed through experimentation.

The pressure within the intake manifold may be measured and predicted as discussed below, and the intake manifold pressure used to predict the mass flow rate of intake air may be the most recent measurement or prediction of the intake manifold pressure. The ambient air pressure may be measured and/or estimated based on the throttle inlet air pressure from the TIAP sensor 188. The cylinder air temperature may be estimated based on the engine coolant temperature from the ECT sensor 182, the mass flow rate of intake air from the MAF sensor 186, and/or the intake air temperature from the IAT sensor 192. Additionally or alternatively, the cylinder air temperature may be estimated based on an ambient air temperature and a vehicle speed, which may be measured and/or estimated based on other parameters.

Referring again to FIG. 2, an intake valve status module 204 determines a status of the intake valve 122 such as whether the intake valve 122 is open or closed. The intake valve status module 204 may determine the intake valve status based on the intake cam phaser position from the ICPP sensor 194, the crankshaft position from the CKP sensor 180, and/or a cylinder deactivation command. The intake valve status module 204 may determine when an intake valve of a cylinder opens and closes based on the intake cam phaser position and the crankshaft position. The intake valve status module 204 may determine that a status of an intake valve of a cylinder is closed when the cylinder deactivation command indicates that the cylinder is deactivated.

A cylinder deactivation module 206 generates the cylinder deactivation command to deactivate one or more cylinders of the engine 102 and/or to change which one(s) of the cylinders are active from one firing sequence to the next firing sequence. The cylinder deactivation module 206 may generate the cylinder deactivation command when the engine 102 can satisfy a driver torque request after one or more cylinders of the engine 102 are deactivated. The cylinder deactivation module 206 may determine the drive torque request based on the driver input from the driver input module 104.

An intake port flow module 208 determines a mass flow rate of air flowing through an intake port. Air flow through the intake port is regulated by the intake valve 122. The engine 102 may include multiple cylinders and/or multiple intake ports for each cylinder, as discussed above, and the intake port flow module 208 may determine the mass flow rates of air flowing through the intake port(s) associated with each cylinder. The intake port flow module 208 may determine the mass flow rate of air flowing through an intake port of a cylinder based on the intake manifold pressure, a pressure within the cylinder, and an intake valve status associated with the intake port.

Figure 4:
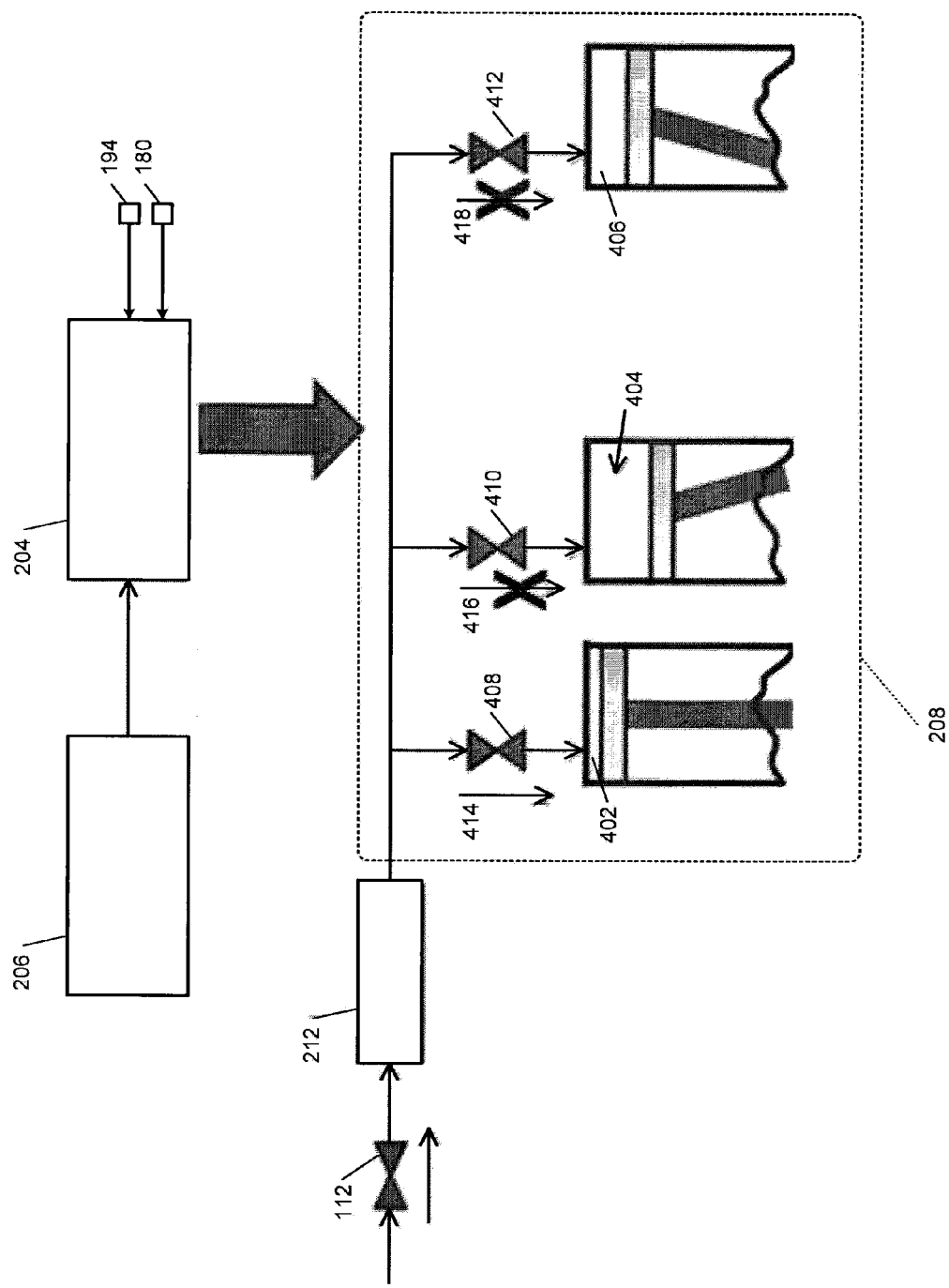
FIGS. 4 and 5 are a functional block diagrams of example components of the engine and control systems shown in FIGS. 1 and 2.

In one example, with additional reference to FIG. 4, the engine 102 may include cylinders 402, 404, 406, having intake ports 408, 410, and 412, respectively. The cylinder 402 may be active. Therefore, the intake valve status associated with the intake port 408 may be open, and air may flow through the intake port 408 as indicated by arrow 414. Thus, the intake port flow module 208 may determine the mass flow rate of air flowing through the intake port 408 based on a pressure drop across the intake port 408. The intake port flow module 208 may determine the pressure drop across the intake port 408 by calculating a difference between the intake manifold pressure and a pressure within the cylinder 404. The intake manifold pressure and the cylinder pressure may be measured and predicted, and the most recent measurements or predictions of the intake manifold pressure and the cylinder pressure may be used to determine the pressure drop across the intake port 408.

The cylinders 404 and 406 may be deactivated. Therefore, the intake valve status associated with the cylinders 404 and 406 may be closed, and air may not flow through the intake ports 410 and 412 as indicated by X's through arrows 416 and 418. In this case, the intake port flow module 208 may determine that the mass flow rate of air flowing through the intake ports 408 and 410 is zero.

Figure 5:
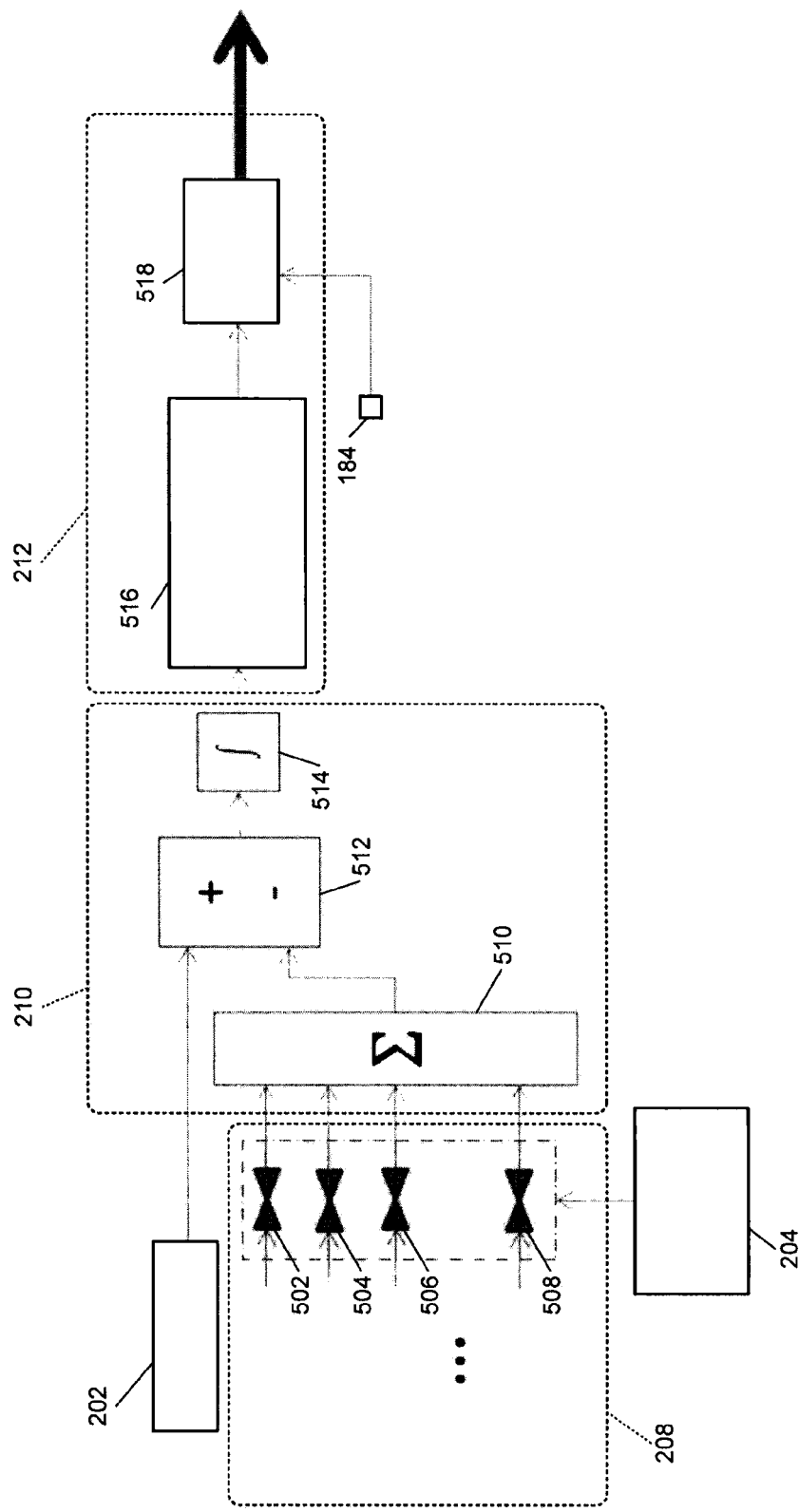

Referring now to FIGS. 2 and 5, an intake manifold mass module 210 determines a mass of air within the intake manifold 110. The intake manifold mass module 210 may determine the intake manifold mass based on a sum of an initial intake manifold mass and a change in the intake manifold mass over a first period. The intake manifold mass module 210 may determine the intake manifold mass at a predetermined rate corresponding to the first period, and the initial intake manifold mass may be the intake manifold mass last determined by the intake manifold mass module 210. The intake manifold mass module 210 may determine the change in the intake manifold mass over the first period by determining a difference between a mass of air entering the intake manifold 110 over the first period and a mass of air exiting the intake manifold 110 over the first period. a sum of intake port flow rates over the first period.

The intake manifold mass module 210 may determine the mass of air entering the intake manifold 110 based on the intake manifold flow rate most recently measured or predicted as discussed above. The intake manifold mass module 210 may determine the mass of air exiting the intake manifold 110 based on a sum of the mass flow rates of air flowing through intake ports of the engine 102. In the example illustrated in FIG. 5, the intake ports of the engine 102 may include intake ports 502, 504, 506, and 508. Thus, the intake manifold mass module 210 may determine the sum of the mass flow rates of air flowing through the intake ports 502, 504, 506, and 508 over the first period.

The intake manifold mass module 210 may include a summing module 510, a difference module 512, and an integrating module 514. The summing module 510 may determine the sum of the mass flow rates of air flowing through the intake ports 502, 504, 506, and 508 over the first period. The intake port flow module 208 may determine the mass flow rate of air flowing through the intake ports 502, 504, 506, and 508 at the predetermine rate. The summing module 510 may use the intake port flow rates most recently determined by the intake port flow module 208 to determine the sum of the intake port flow rates over the first period.

The difference module 512 may determine the difference between the intake manifold flow rate over the first period and the sum of the mass flow rates of air flowing through the intake ports 502, 504, 506, and 508 over the first period. The integrating module 514 may determine the integral of this difference with respect to the first period by multiplying the difference by the first period to obtain the change in the intake manifold mass over the first period. The intake manifold mass module 210 may add the change in the intake manifold mass over the first period to the initial manifold mass to predict the intake manifold mass at the end of the first period.

An intake manifold pressure module 212 predicts the pressure within the intake manifold 110. The intake manifold pressure module 212 may include a prediction module 516 and a correction module 518. The prediction module 516 may predict the intake manifold pressure based on a temperature within the intake manifold 110, a volume of the intake manifold 110, and the intake manifold mass using the ideal gas law. For example, the prediction module 516 may predict the intake manifold pressure using a relationship such as $$P_{im} = \frac{R_{im} * T_{im} * m_{im}}{V_{im}} \qquad (1)$$

where $P_{im}$ is the intake manifold pressure, $R_{im}$ is a specific gas constant associated with the intake manifold 110, $T_{im}$ is the intake manifold temperature, $m_{im}$ is the intake manifold mass, and $V_{im}$ is the intake manifold volume. The prediction module 516 may estimate the intake manifold temperature based in the intake air temperature.

The correction module 518 applies a correction factor to the predicted manifold pressure based on previous differences between the predicted manifold pressure and the measured manifold pressure. For example, with brief reference to FIG. 3, the MAP sensor 184 may measure the manifold pressure at the times 302, 304, 306, and 308, and the prediction module 516 may predict the manifold pressure at the times 302-320. Thus, the prediction module 516 may predict the manifold pressure at the times 302, 304, 306, and 308 before the MAP sensor 184 measures the manifold pressure at the times 302, 304, 306, and 308. The correction module 518 may then determine the correction factor based on one or more of the differences between the predicted manifold pressure and the measured manifold pressure. For example, the correction module 518 may adjust the correction factor based on an average of the differences.

Referring again to FIG. 2, a cylinder mass module 214 determines a mass of air within a cylinder of the engine 102 during an intake stroke of the cylinder. The cylinder mass module 214 may determine the cylinder air mass during an intake stroke of a cylinder based on the cylinder air mass before an intake valve of the cylinder opens and a mass flow rate of air flowing through an intake port of the cylinder. The cylinder mass module 214 may determine the cylinder air mass before the intake valve opens based on intake and exhaust cam phaser positions. The cylinder mass module 214 may receive the intake and exhaust cam phaser positions from the ICPP sensor 194 and the ECPP sensor 196, respectively. The cylinder mass module 214 may using the most recently determined mass flow rate of air flowing through one or more intake ports of a cylinder to determine the mass of air within the cylinder.

With additional reference to FIG. 3, the cylinder mass module 214 may determine the cylinder air mass at the times 302-320. A graph 326 illustrates the cylinder air mass at the times 302, 310, 312, 314, and 304. As discussed above, the cylinder mass module 214 determines the cylinder air mass during an intake stroke. Thus, the cylinder air mass increases from the time 302 to the time 304.

More generally, each of the modules 202-216 may determine or predict their respective parameter at the times 302-320. In addition, the MAP sensor 184 and the MAF sensor 186 may measure the manifold pressure and the manifold air flow rate at the times 302, 304, 306, 308. To determine or predict their respective parameters, the modules 202-216 may use parameters most recently measured or determined. If a parameter is both measured and determined at a given time or a given crank angle, the modules 202-216 may use the measured parameter to determine or predict their respective parameter. In various implementations, one or more of the modules 202-216 may stop determining or predicting their respective parameter to reduce the amount of computation power required by the ECM 114. The modules 202-216 may be referred to as engine air prediction modules.

In various implementations, the cylinder mass module 214 may determine the cylinder air mass based on the predicted manifold pressure and a volumetric efficiency of the engine 102. Volumetric efficiency is a ratio of actual airflow through an engine to a theoretical amount of airflow through the engine based on cylinder volume. However, since the cylinder pressure and the intake port flow rates are predicted, the cylinder mass module 214 may determine the cylinder air mass without using the volumetric efficiency.

Referring again to FIG. 2, a cylinder pressure module 216 determines a pressure within a cylinder of the engine 102. The cylinder pressure module 216 may determine the pressure within a cylinder based on a mass of air within the cylinder, a temperature of air within the cylinder, and a volume of the cylinder using the ideal gas law. For example, the prediction module 516 may predict the intake manifold pressure using a relationship such as $$P_{cyl} = \frac{R_{cyl} * T_{cyl} * m_{cyl}}{V_{cyl}} \quad (2)$$

where $P_{cyl}$ is the cylinder pressure, $R_{cyl}$ is a specific gas constant associated with the cylinder, $T_{cyl}$ is the cylinder air temperature, $m_{cyl}$ is the cylinder air mass, and $V_{cyl}$ is the cylinder air volume. The cylinder pressure module 216 may estimate the cylinder air temperature based on one or more measured parameters such as engine coolant temperature, mass flow rate of intake air, and/or intake air temperature.

A torque control module 218 controls the amount of torque produced by the engine 102 based on the diver input from the driver input module 104. The torque control module 218 may determine a driver torque request based on the driver input and control the engine torque based on the driver torque request. The torque control module 218 may receive predicted engine air parameters such the predicted manifold flow rate, the predicted manifold pressure, and the predicted cylinder air mass. The torque control module 218 may communicate the predicted air parameters to a throttle control module 220, a fuel control module 222, a spark control module 224, and/or a valve control module 226. The torque control module 218 may also determine desired values of the predicted engine air parameters based on the driver torque request and communicate the desired values to the control modules 220-226.

The throttle control module 220 outputs a throttle control signal to the throttle actuator module 116 to control the throttle valve 112. The fuel control module 222 outputs a fuel control signal to the fuel actuator module 124 to control fuel injection in the engine 102. The spark control module 224 outputs a spark control signal to the spark actuator module 126 to control the spark plug 128. The valve control module 226 outputs a valve control signal to the valve actuator module 158 to control the intake and exhaust valves 122 and 130.

The control modules 220-226 may control the respective engine actuator based on the predicted engine air parameters. For example, the throttle actuator module 116 may decrease the opening area of the throttle valve 112 when the predicted manifold flow rate, the predicted manifold pressure, and/or the predicted cylinder air mass are greater than desired. Conversely, the throttle actuator module 116 may increase the throttle area when the predicted manifold flow rate, the predicted manifold pressure, and/or the predicted cylinder air mass are less than desired. The control modules 220-226 may be referred to as engine actuator modules.

Figure 6:
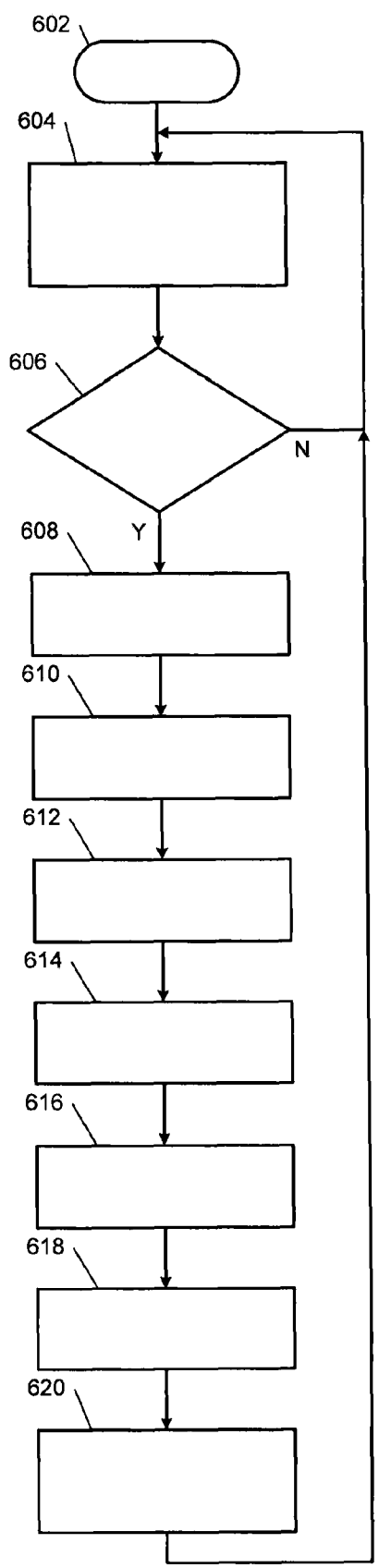
FIG. 6 is a flowchart illustrating an example control method according to the principles of the present disclosure.

Referring now to FIG. 6, a method for predicting parameters associated with airflow through an engine begins at 602. At 604, the method measures a mass flow rate of air flowing through an intake manifold of the engine and a pressure within the intake manifold. The may measure the manifold flow rate and the manifold pressure at a first rate. For example, the method may measure the manifold flow rate and the manifold pressure every 90 degrees of crankshaft rotation. The amount of crankshaft rotation between measurements may be predetermined, and the first rate at which the measurements are performed may depend on the speed of the engine.

At 606, the method determines whether a piston within a cylinder of the engine is completing an intake stroke. If the piston is completing an intake stroke, the method continues at 608. Otherwise, the method continues at 604.

At 608, the method predicts the manifold flow rate at a second rate that is greater than the first rate. For example, the method may measure the manifold flow rate and the manifold pressure every 6 to 10 degrees of crankshaft rotation. The amount of crankshaft rotation between measurements may be predetermined, and the second rate at which the predictions are made may depend on the engine speed.

As indicated by the decision at 606, the method may predict the manifold flow rate during an intake stroke of the cylinder. Thus, the method may measure the manifold flow rate at M times during a period corresponding to the intake stroke, and the method may predict the manifold flow rate at N times during the same period, where M and N are integers and N is greater than M. The method may predict the manifold flow rate based on a pressure within the intake manifold, an ambient air pressure, and a temperature of air in the cylinder as discussed above with reference to the intake manifold airflow module 202 of FIG. 2.

At 610, the method determines a status of an intake valve that regulates flow through an intake port associated with the cylinder. The method determines the intake valve status at the second rate. The method may determine the intake valve status based on a cylinder deactivation command, an intake cam phaser position, and a crankshaft position as discussed above with reference to the intake valve status module 204 of FIG. 2.

At 612, the method predicts a mass of air within the cylinder during the intake stroke. The method predicts the cylinder air mass at the second rate. The method may predict the cylinder air mass based on the cylinder air mass before the intake valve opens and a mass flow rate of airflow through an intake port of the cylinder as discussed above with reference to the cylinder mass module 214 of FIG. 2.

At 614, the method determines a pressure within the cylinder at the second rate. The method may determine the cylinder pressure based on the cylinder air mass and the cylinder air temperature as discussed above with reference to the cylinder pressure module 216 of FIG. 2. The method may determine the cylinder air mass, the cylinder pressure, and the cylinder air temperature for each cylinder in the engine.

At 616, the method determines a mass flow rate of air flowing through an intake port of the cylinder. The method determines the intake port flow rate at the second rate. The method may determine the intake port flow rate based on the manifold pressure, cylinder pressure, and the intake valve status as discussed above with reference to the intake port flow module 208 of FIG. 2.

At 618, the method predicts a mass of air within the intake manifold. The method predicts the manifold air mass at the second rate. The method may predict the manifold air mass based on a mass flow rate of air entering the intake manifold and a mass flow rate of air exiting the intake manifold as discussed above with reference to the intake manifold mass module 210 of FIG. 2. At 620, the method predicts the manifold pressure at the second rate. The method may predict the manifold pressure based on the manifold air mass and the cylinder air temperature as discussed above with reference to the intake manifold pressure module 212 of FIG. 2.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
an engine air sensor that measures an engine air parameter at a first rate, wherein the engine air parameter includes at least one of a mass flow rate of air flowing into an intake manifold of an engine, a pressure within the intake manifold, and a mass of air within a cylinder of the engine;
an engine air prediction module that predicts an actual value of the engine air parameter at a second rate that is greater than the first rate; and
an engine actuator module that controls an actuator of the engine based on at least one of the measured engine air parameter and the predicted engine air parameter.

2. The system of claim 1 further comprising an intake manifold airflow module that predicts the mass flow rate of air flowing into the intake manifold based on the pressure within the intake manifold, an ambient air pressure, and a temperature of air in the cylinder.

3. The system of claim 1 further comprising an intake manifold pressure module that predicts the pressure within the intake manifold based on a mass of air within the intake manifold and a temperature of air in the cylinder.

4. The system of claim 3 further comprising an intake manifold mass module that predicts the mass of air within the intake manifold based on a mass flow rate of air entering the intake manifold and a mass flow rate of air exiting the intake manifold.

5. The system of claim 4 wherein the intake manifold mass module determines the mass flow rate exiting the intake manifold based on a sum of a plurality of mass flow rates of air flowing through intake ports of cylinders in the engine.

6. The system of claim 5 further comprising an intake port flow module that determines the mass flow rates of air flowing through the intake ports of the cylinders based on the pressure within the intake manifold, pressures within the cylinders, and an intake valve status.

7. The system of claim 6 further comprising a cylinder pressure module that determines the pressures within the cylinders based on a mass of air within the cylinders and the temperature of air in the cylinders.

8. The system of claim 6 further comprising an intake valve status module that determines the intake valve status based on a cylinder deactivation command, an intake cam phaser position, and a crankshaft position.

9. The system of claim 1 further comprising a cylinder mass module that predicts the mass of air within the cylinder during an intake stroke of the cylinder based on the mass of air within the cylinder before an intake valve of the cylinder opens and a mass flow rate of air flowing through an intake port of the cylinder.

10. The system of claim 9 wherein the cylinder mass module determines the mass of air within the cylinder before the intake valve opens based on an intake cam phaser position and an exhaust cam phaser position.

11. A method comprising:
measuring an engine air parameter at a first rate, wherein the engine air parameter includes at least one of a mass flow rate of air flowing into an intake manifold of an engine, a pressure within the intake manifold, and a mass of air within a cylinder of the engine;
predicting an actual value of the engine air parameter at a second rate that is greater than the first rate; and
controlling an actuator of the engine based on at least one of the measured engine air parameter and the predicted engine air parameter.

12. The method of claim 11 further comprising predicting the mass flow rate of air flowing into the intake manifold based on the pressure within the intake manifold, an ambient air pressure, and a temperature of air in the cylinder.

13. The method of claim 11 further comprising predicting the pressure within the intake manifold based on a mass of air within the intake manifold and a temperature of air in the cylinder.

14. The method of claim 13 further comprising predicting the mass of air within the intake manifold based on a mass flow rate of air entering the intake manifold and a mass flow rate of air exiting the intake manifold.

15. The method of claim 14 further comprising determining the mass flow rate exiting the intake manifold based on a sum of a plurality of mass flow rates of air flowing through intake ports of cylinders in the engine.

16. The method of claim 15 further comprising determining the mass flow rates of air flowing through the intake ports of the cylinders based on the pressure within the intake manifold, pressures within the cylinders, and an intake valve status.

17. The method of claim 16 further comprising determining the pressures within the cylinders based on a mass of air within the cylinders and the temperature of air in the cylinders.

18. The method of claim 16 further comprising determining the intake valve status based on a cylinder deactivation command, an intake cam phaser position, and a crankshaft position.

19. The method of claim 11 further comprising predicting the mass of air within the cylinder during an intake stroke of the cylinder based on the mass of air within the cylinder before an intake valve of the cylinder opens and a mass flow rate of air flowing through an intake port of the cylinder.

20. The method of claim 19 further comprising determining the mass of air within the cylinder before the intake valve opens based on an intake cam phaser position and an exhaust cam phaser position.

\* \* \* \* \*